United States Patent
Beales et al.

(10) Patent No.: US 9,528,340 B2
(45) Date of Patent: Dec. 27, 2016

(54) SOLENOID VALVE HOUSINGS FOR BLOWOUT PREVENTER

(71) Applicant: Hydril USA Distribution LLC, Houston, TX (US)

(72) Inventors: Thomas David Beales, Houston, TX (US); Alexander McAuley, Houston, TX (US); Zachary William Stewart, Houston, TX (US); Daniel Carrera, Houston, TX (US)

(73) Assignee: Hydrill USA Distribution LLC, Houston, TX (US)

( * ) Notice: Subject to any disclaimer, the term of this patent is extended or adjusted under 35 U.S.C. 154(b) by 0 days.

(21) Appl. No.: 14/971,669

(22) Filed: Dec. 16, 2015

(65) Prior Publication Data

US 2016/0177654 A1    Jun. 23, 2016

Related U.S. Application Data

(60) Provisional application No. 62/093,083, filed on Dec. 17, 2014.

(51) Int. Cl.
| | | |
|---|---|---|
| *E21B 33/064* | (2006.01) | |
| *F16K 31/06* | (2006.01) | |
| *E21B 33/035* | (2006.01) | |

(52) U.S. Cl.
CPC ......... *E21B 33/064* (2013.01); *E21B 33/0355* (2013.01); *F16K 31/06* (2013.01)

(58) Field of Classification Search
CPC .......................... E21B 33/0355; E21B 33/064
See application file for complete search history.

(56) References Cited

U.S. PATENT DOCUMENTS

| | | |
|---|---|---|
| 3,902,554 A | 9/1975 | Hooper |
| 4,109,938 A | 8/1978 | Mitchell et al. |
| (Continued) | | |

FOREIGN PATENT DOCUMENTS

| | | |
|---|---|---|
| CN | 201250646 Y | 6/2009 |
| WO | 9826155 A1 | 6/1998 |
| (Continued) | | |

OTHER PUBLICATIONS

John S. Holmes et al., filed Sep. 30, 2015, U.S. Appl. No. 14/870,249.

(Continued)

*Primary Examiner* — Matthew R Buck
(74) *Attorney, Agent, or Firm* — Hogan Lovells US LLP

(57) ABSTRACT

A subsea blowout preventer control system has horizontally oriented solenoid valve housings. Solenoid valves mounted within each of the solenoid valve housings are electrically controlled to selectively provide a hydraulic pilot signal to a hydraulic valve. A vertically extending central chamber contains a dielectric liquid and extends alongside the solenoid valve housings. A communication tube for each solenoid valve housing has an open upper end within the central chamber adjacent an upper end of the central chamber. Each of the communication tubes has an open lower end extending into one of the solenoid valve housings for communicating dielectric liquid in the central chamber with an interior of each of the solenoid valve housings. A separate drain line mounted to each of the solenoid valve housings enables draining of one of the solenoid valve housings for maintenance without requiring draining of other of the solenoid valve housings.

19 Claims, 2 Drawing Sheets

(56) References Cited

U.S. PATENT DOCUMENTS

| | | | |
|---|---|---|---|
| 4,618,173 A | 10/1986 | Dopyera et al. | |
| 4,709,726 A | 12/1987 | Fitzgibbons | |
| 5,166,677 A * | 11/1992 | Schoenberg | E21B 33/0355 166/335 |
| 5,314,024 A | 5/1994 | Rodgers et al. | |
| 5,398,761 A * | 3/1995 | Reynolds | E21B 33/064 166/344 |
| 5,778,918 A | 7/1998 | McLelland | |
| 5,781,192 A | 7/1998 | Kodimer | |
| 5,867,150 A | 2/1999 | Bricklin et al. | |
| 6,032,742 A * | 3/2000 | Tomlin | E21B 33/063 166/345 |
| 6,040,969 A | 3/2000 | Winch et al. | |
| 6,041,804 A | 3/2000 | Chatufale | |
| 6,835,292 B2 | 12/2004 | Sato et al. | |
| 6,957,205 B1 | 10/2005 | Liongosari et al. | |
| 6,961,226 B2 | 11/2005 | Mason, Jr. et al. | |
| 6,990,498 B2 | 1/2006 | Fenton et al. | |
| 7,000,890 B2 * | 2/2006 | Bell | E21B 34/04 251/129.15 |
| 7,111,874 B2 | 9/2006 | Smith, III | |
| 7,113,668 B2 | 9/2006 | Sorum et al. | |
| 7,216,715 B2 | 5/2007 | Reynolds | |
| 7,261,162 B2 | 8/2007 | Deans et al. | |
| 7,337,848 B2 | 3/2008 | Fraser et al. | |
| 7,558,684 B2 | 7/2009 | Patten et al. | |
| 7,571,772 B2 | 8/2009 | Reams | |
| 7,760,670 B2 | 7/2010 | Causier | |
| 7,832,706 B2 | 11/2010 | Judge | |
| 7,849,599 B2 | 12/2010 | Huff et al. | |
| 7,887,103 B2 | 2/2011 | Evans et al. | |
| 7,913,767 B2 | 3/2011 | Larson et al. | |
| 7,975,770 B2 | 7/2011 | Keener | |
| 8,020,623 B2 * | 9/2011 | Parks | E21B 33/0355 166/339 |
| 8,054,593 B2 | 11/2011 | Reid et al. | |
| 8,157,025 B2 | 4/2012 | Johnson | |
| 8,157,295 B2 | 4/2012 | Krywitsky | |
| 8,230,735 B2 | 7/2012 | Chouzenoux et al. | |
| 8,322,436 B2 | 12/2012 | Maa | |
| 8,388,255 B2 | 3/2013 | Larson et al. | |
| 8,403,053 B2 | 3/2013 | Judge | |
| 8,464,797 B2 | 6/2013 | Singh | |
| 8,469,048 B2 | 6/2013 | Bresnahan | |
| 8,602,108 B2 | 12/2013 | Mathis | |
| 8,607,879 B2 * | 12/2013 | Reynolds | E21B 33/035 166/336 |
| 8,708,054 B2 | 4/2014 | Dailey, Jr. | |
| 8,724,957 B2 | 5/2014 | Oisel et al. | |
| 8,781,743 B2 | 7/2014 | McKay et al. | |
| 8,812,274 B2 | 8/2014 | Virkar et al. | |
| 8,944,403 B2 | 2/2015 | Jurena et al. | |
| 9,057,751 B2 | 6/2015 | Spencer et al. | |
| 9,085,948 B2 | 7/2015 | Egeland | |
| 9,151,794 B2 | 10/2015 | Radan | |
| 2010/0300696 A1 | 12/2010 | McCalvin et al. | |
| 2011/0266002 A1 * | 11/2011 | Singh | E21B 33/0355 166/339 |
| 2011/0266003 A1 * | 11/2011 | Singh | E21B 33/064 166/368 |
| 2012/0233128 A1 | 9/2012 | Solmer | |
| 2012/0312546 A1 | 12/2012 | Bussear et al. | |
| 2012/0318517 A1 | 12/2012 | Christensen et al. | |
| 2013/0054034 A1 | 2/2013 | Ebenezer | |
| 2013/0118755 A1 | 5/2013 | Kotrla et al. | |
| 2013/0253872 A1 | 9/2013 | Curtis et al. | |
| 2013/0255956 A1 | 10/2013 | Gilmore et al. | |
| 2013/0283919 A1 | 10/2013 | Coonrod et al. | |
| 2014/0048274 A1 * | 2/2014 | Reynolds | E21B 33/064 166/338 |
| 2014/0061516 A1 | 3/2014 | Gustafson | |
| 2014/0064029 A1 | 3/2014 | Jaffrey | |
| 2014/0321341 A1 | 10/2014 | Kristiansen | |
| 2014/0361785 A1 | 12/2014 | Radan | |
| 2015/0015066 A1 | 1/2015 | Dong et al. | |
| 2015/0041122 A1 | 2/2015 | Valsecchi | |
| 2015/0101674 A1 | 4/2015 | Gustafson | |
| 2015/0129233 A1 | 5/2015 | Gaude et al. | |
| 2015/0184505 A1 | 7/2015 | Panicker-Shah | |
| 2015/0198001 A1 | 7/2015 | McWhorter et al. | |
| 2015/0233202 A1 | 8/2015 | Caldwell et al. | |
| 2015/0260203 A1 | 9/2015 | Launonen | |

FOREIGN PATENT DOCUMENTS

| | | |
|---|---|---|
| WO | 0001915 A2 | 1/2000 |
| WO | 2013192494 A1 | 12/2013 |

OTHER PUBLICATIONS

John Steven Holmes et al., filed Oct. 15, 2015, U.S. Appl. No. 14/884,563.

John S. Holmes et al., filed Nov. 11, 2015, U.S. Appl. No. 14/938,074.

Alex David Stibich et al., filed Dec. 9, 2015, U.S. Appl. No. 14/963,849.

Glen Allen Scott et al., filed Dec. 17, 2015, U.S. Appl. No. 14/972,848.

Michael James Connor et al., filed Dec. 16, 2015, U.S. Appl. No. 14/971,381.

William James Hatter et al., filed Dec. 17, 2015, U.S. Appl. No. 14/972,266.

Thomas David Beales et al., filed Dec. 16, 2015, U.S. Appl. No. 14/971,305.

Alexander Michael Mcauley et al., filed Nov. 11, 2015, U.S. Appl. No. 14/938,599.

PCT Search Report and Written Opinion issued in connection with Corresponding Application No. PCT/US2015/066307 on Mar. 14, 2016.

McCord, "A Multiplex System for a Small Remotely Manned Submersible", IEEE Ocean 1975, pp. 361-364, 1975.

Hickok, "Practical Experience of Control Valve Behavior", Subsea Control and Data Acquisition: Proceedings of an International conference, London, UK, pp. 195-203, Apr. 4-5, 1990.

Martin et al., "A Proven Oil/Water/Gas Flowmeter for Subsea, Offshore Technology Conference", Offshore Technology Conference, Houston, pp. 589-596, May 6-9, 1991.

Ali et al., "Subsea Valve Actuator for Ultra Deepwater", Offshore Technology Conference, Houston, Texas, 1996 proceedings, pp. 799-809, May 6-9, 1996.

Altamiranda et al., "Intelligent Supervision and Integrated Fault Detection and Diagnosis for Subsea Control Systems", Oceans 2007 Europe, pp. 1-6, Jun. 18-21, 2007.

Wang et al., "Water Hammer Effects on Water Injection Well Performance and Longevity", Society of Petroleum Engineers, SPE International Symposium and Exhibition on Formation Damage Control,Lafayette, Louisiana, USA, pp. 1-10, Feb. 13-15, 2008.

Vetcogray, "Capital Drilling Equipment", Retrieved from http://site.ge-energy.com/businesses/ge_oilandgas/en/literature/en/downloads/capital_drilling_equipment_pdf, pp. 1-15, 2008.

Altamiranda et al., "Condition Monitoring and Diagnosis for Subsea Control Systems. A Subsystem Prototype", Oceans 2009 Europe, pp. 1-6, May 11-14, 2009.

Whitby et al., "20KSI BOP Stack Development", SPE International, pp. 1-5, Feb. 2-4, 2010.

Tang et al., "A Dynamic Simulation Study of Water Hammer for Offshore Injection Wells to Provide Operation Guidelines", SPE Production & Operations, vol. No. 25, Issue No. 4, pp. 509-523, Nov. 2010.

Shanks et al., "OTC 23473 New Generation Control System for 20 KSI Subsea BOP", Offshore Technology conference, pp. 1-12, May 3, 2012.

Levine et al., "BSEE and BOEM Workshop with Government of Israel Application for Permit to Drill", pp. 1-40, Jul. 24, 2012.

Cai et al., "Reliability Analysis of Subsea Blowout Preventer Control Systems Subjected to Multiple Error Shocks", Journal of Loss Prevention in the Process Industries, vol. No. 25, Issue No. 6, pp. 1044-1054, Nov. 1, 2012.

(56) References Cited

OTHER PUBLICATIONS

Cai et al., "Application of Bayesin Networks to Reliability Evaluation of Software Systems for Subsea Blowout Preventers", International Journal of Control and Automation, pp. 47-60, Feb. 28, 2013.
Umofia., "Risk-Based Reliability Assessment of Subsea Control Module for Offshore Oil and Gas production", Cranfield University, School of Engineering, Department of Offshore, Process and Energy Engineering, pp. 1-284, Sep. 2014.
Chazal et al., "Enhancements in Fraction Measurements and Flow Modeling for Multiphase Flowmeters" Society of Petroleum Engineers, SPE Annual Technical Conference and Exhibition, pp. 1-19, Oct. 27-29, 2014.
PCT Search Report and Written Opinion issued in connection with Related Application No. PCT/US2015/053238 on Feb. 1, 2016.
PCT Search Report and Written Opinion issued in connection with Related Application No. PCT/US2015/055915 on Feb. 2, 2016.
GE Oil & Gas, "GE's 20-ksi" BOP Completely Re-Engineered to Meet Demands of HPHT Reservoirs, Drilling contractor, pp. 1-2, Feb. 17, 2016.
Cameron., "Mark III Subsea MUX BOP Control System", Drilling Pressure Control Equipment, Retrieved from http://www.c-a-m.com/products-and-services/drilling/drilling-pressure-control-equipment/mark-iii-subsea-mux-bop-control-system, pp. 1-4, Feb. 19, 2016.

\* cited by examiner

SOLENOID VALVE HOUSINGS FOR BLOWOUT PREVENTER

CROSS REFERENCE TO RELATED APPLICATION

This application claims priority to provisional application 62/093,083, filed Dec. 17, 2014.

FIELD OF THE DISCLOSURE

This applications relates in general to blowout preventers for subsea well drilling, and in particular to a control system for a blowout preventer, the control system having solenoid valve housings that can be separately drained of dielectric fluid for maintenance.

BACKGROUND

Offshore drilling operations require a blowout preventer connected with the drilling riser to control well pressure. A typical subsea blowout preventer ("BOP") has many components, such as one or more annular blowout preventers, several pipe rams, connectors for connecting to wellhead equipment, and a quick release connector for releasing an upper portion of the BOP and the drilling riser from a lower portion in the event of an emergency. Most of these components, also referred to as functions, are hydraulically actuated.

The BOP has a control system, also referred to as a multiplex or MUX pod layout, to control these various functions by supplying hydraulic fluid pressure to perform the particular function. The control system has hydraulic valves, called SPM (sub plate manifold) valves, that supply hydraulic fluid pressure to the various BOP components. The control system has solenoid valves, that when receiving an electrical signal, send a hydraulic pilot signal to one of the hydraulic valves.

Several of the solenoid valves may be mounted in a solenoid valve housing that is filled with an electrically insulating dielectric liquid. A typical control system will have several solenoid valve housings. Each solenoid valve housing may have a pressure compensator to equalize the dielectric liquid pressure with the hydrostatic pressure of the sea water.

Current practice requires all of the solenoid housings to be drained of dielectric fluid any time a component located in one of the solenoid housings needs to be serviced. The total volume of dielectric fluid in the control system can exceed 80 gallons. As a result, a large quantity dielectric fluid is lost and must be replaced each time maintenance is required in one of the solenoid valve housings.

SUMMARY

A subsea blowout preventer control system has a plurality of solenoid valve housings mounted in at least one vertical column. A plurality of solenoid valves are mounted within each of the solenoid valve housings. The control system has a plurality of hydraulic valves, each of the hydraulic valves being hydraulically connected to and controlled by one of solenoid valves. The control system has a central chamber containing a dielectric liquid. A separate communication tube for each solenoid valve housing communicates the dielectric liquid in the central chamber with the interior of the solenoid valve housing. Each of the communication tubes has an open lower end in one of the solenoid valve housings and an open upper end within the central chamber that is at an elevation at least equal to an upper end of the vertical column of valve housings. A separate drain line mounted to each of the solenoid valve housings enables draining of one of the solenoid valve housings for maintenance while the control system is retrieved without requiring draining of the other solenoid valve housings.

In one embodiment, a pressure compensator within the central chamber equalizes a pressure of the dielectric liquid within the central chamber and in all of the solenoid valve housings with a hydrostatic pressure of sea water surrounding the system.

A separate air vent line extends from each of the solenoid valve housings. An air vent valve connects to each of the air vent lines.

In one example, the open upper ends of each of the communication tubes are at substantially the same elevation within the central chamber. The central chamber extends vertically alongside the solenoid valve housings. An electrical wire extends from within the central chamber sealingly through a wall of the central chamber and sealingly through a wall of each of the solenoid valve housings to one of the solenoid valves within said each of the solenoid valve housings.

In the embodiment shown, each of the solenoid valve housings has a horizontal lower side and a horizontal upper side. The open lower end of each of the communication tubes is nearer to the lower side than to the upper side. Each of the communication tubes has a vertical portion within the central chamber, the vertical portions being parallel with each other.

BRIEF DESCRIPTION OF THE DRAWINGS

So that the manner in which the features, advantages and objects of the disclosure, as well as others which will become apparent, are attained and can be understood in more detail, more particular description of the disclosure briefly summarized above may be had by reference to the embodiment thereof which is illustrated in the appended drawings, which drawings form a part of this specification. It is to be noted, however, that the drawings illustrate only a preferred embodiment of the disclosure and are therefore not to be considered limiting of its scope as the disclosure may admit to other equally effective embodiments.

DETAILED DESCRIPTION OF THE DISCLOSURE

The methods and systems of the present disclosure will now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

Figure 1:
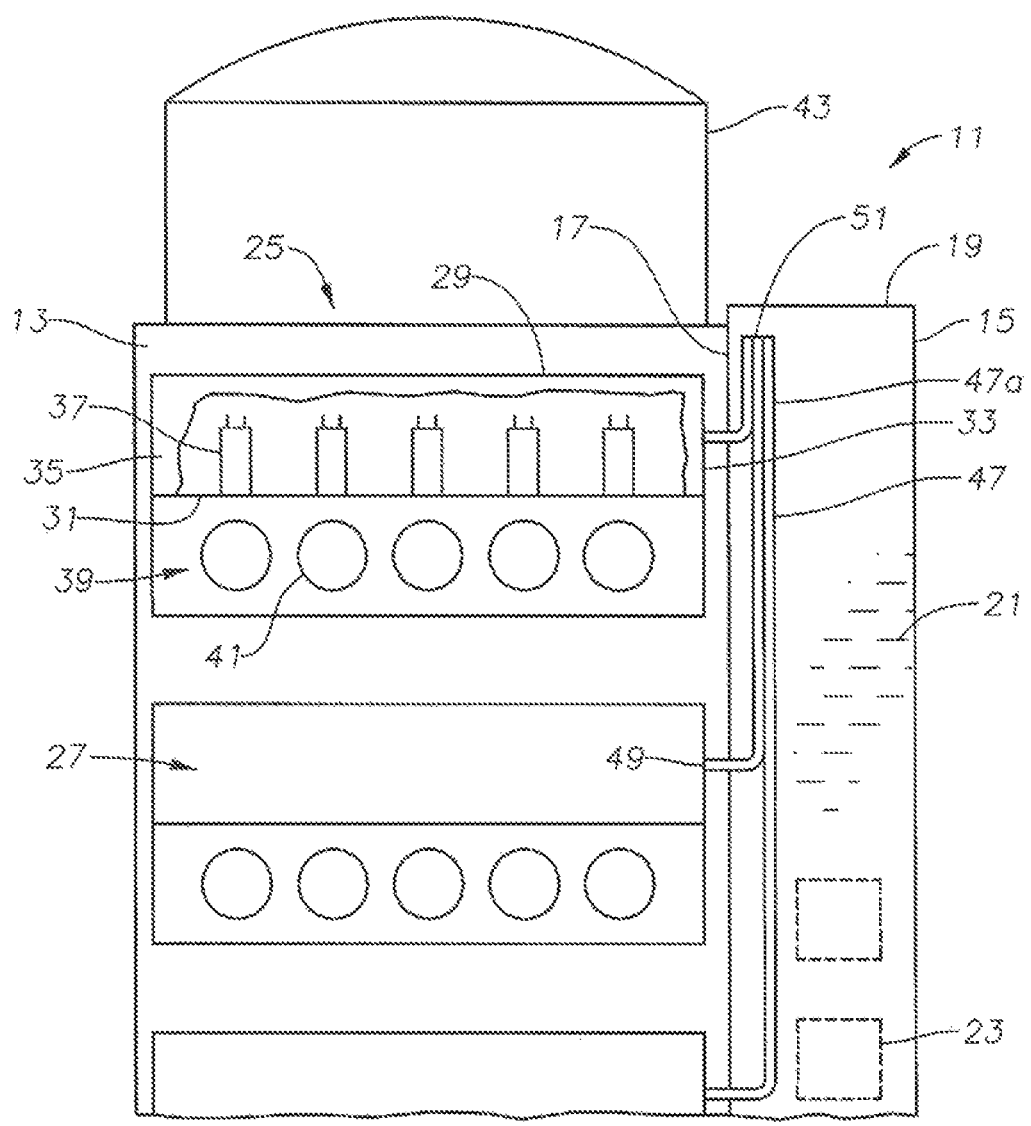
FIG. 1 is a partial front schematic view of a blowout preventer control system in accordance with this disclosure, showing the cover plate of one of the solenoid valve housings partially broken out.

FIG. 1 schematically illustrates an upper part of a control system 11 for a subsea blowout preventer (not shown). The subsea blowout preventer ("BOP") has many components, such as one or more annular blowout preventers, several pipe rams, connectors for connecting to wellhead equipment, and a quick release connector for releasing an upper portion of the BOP and a riser from a lower portion in the event of an emergency. Most of these components, also referred as functions, are hydraulically actuated. Control system 11, also referred to as a multiplex or MUX pod layout, is mounted to the BOP and controls these various functions by supplying hydraulic fluid pressure to perform the particular function.

Control system 11 includes a supporting frame 13, which may be of various configurations. A central housing or chamber 15 mounts to frame 13. Central chamber 15 is elongated with a length that extends vertically along frame 13. In the example shown, central chamber 15 is rectangular, having two vertical side walls 17 that are parallel with each other. Central chamber 15 has an upper end 19 and a lower end (not shown) that may be perpendicular to side walls 17. A conventional dielectric liquid 21 with electrical insulating properties fills the interior of central chamber 15.

In this embodiment, one or more (two shown) pressure compensators 23 are located in central chamber 15. Each pressure compensator 23 is conventional and may have various configurations. Each pressure compensator 23 has a movable barrier, such as a piston, bellows, or diaphragm, or a combination thereof, that has one side exposed to sea water pressure and another side exposed to dielectric liquid 21. The hydrostatic pressure of the sea water causes the barrier to move to equalize the pressure of dielectric liquid with the hydrostatic pressure, or at least reduce a pressure differential.

The interior of central chamber 15 may be divided into two separate cavities sealed from each other, each containing dielectric liquid 21. One of the pressure compensators 23 may be located in one of the cavities, and the other in the other cavity.

Central chamber 15 is adjacent two vertical columns 25 (one shown) of control system 11, each adjacent vertical side wall 17. Solenoid valve housings 27 are secured to frame 13, one above the other, in each vertical column 25. In the example, FIG. 1 shows only two solenoid valve housings 27 in each column 25. Normally, there will be several more solenoid valve housings 27 in each column 25.

Each solenoid valve housing 27 is generally rectangular and oriented with its length horizontal. Each solenoid valve housing 27 has a flat upper side 29 that is parallel and spaced above a flat lower side 31. Vertical end walls 33 join opposite ends of the upper and lower sides 29, 31 to each other. Vertical end walls 33 are parallel to central chamber side walls 17. An inner one of the vertical end walls 33 is closely spaced to one of the central chamber side wall 17. Each solenoid valve housing 27 has a removable cover plate 35 on its front side secured by fasteners.

Several solenoid valves 37 mount within each solenoid valve housing 27 to lower side 31. As an example, the drawings shows five of the solenoid valves 37, but the number could vary, such as six to eight. Each solenoid valve 37 may be a conventional electrically actuated valve that sends a hydraulic pilot signal upon received of an electrical control signal.

A row 39 of hydraulic valves 41 mounts to frame 13 below each solenoid valve housing 27. Hydraulic valves 41 are conventional and often referred to as SPM or sub plate manifold valves. In this example, each row 39 is horizontal and located directly below one of the solenoid housings 27. Each hydraulic valve row 39 thus alternates with one of the solenoid valve housings 27 in each vertical column 25. When signaled by a pilot signal from one of the solenoid valves 37, each hydraulic valve 41 supplies or receives hydraulic fluid under pressure to perform one of the BOP functions. Each solenoid valve 37 hydraulically connects to one of the hydraulic valves 41.

Two subsea electronics modules 43 (only one shown) mount to frame 13. Each subsea electronics module 43 houses electronics for supplying electrical signals to the various solenoid valves 37. Normally, the interior of each subsea electronics module 43 will be at one atmosphere pressure while subsea, not pressure compensated. Subsea electronics modules 43 are redundant with each other.

Solenoid valves 37 and hydraulic valves 41 within one of the columns 25 are typically redundant with solenoid valves 37 and hydraulic valves 41 in another column 25. One of the chambers or cavities of central chamber 15 may supply dielectric liquid 21 to solenoid valve housings 27 in one of the columns 25, and the other to the other solenoid valve housings 26 in the other column 25.

Figure 2:
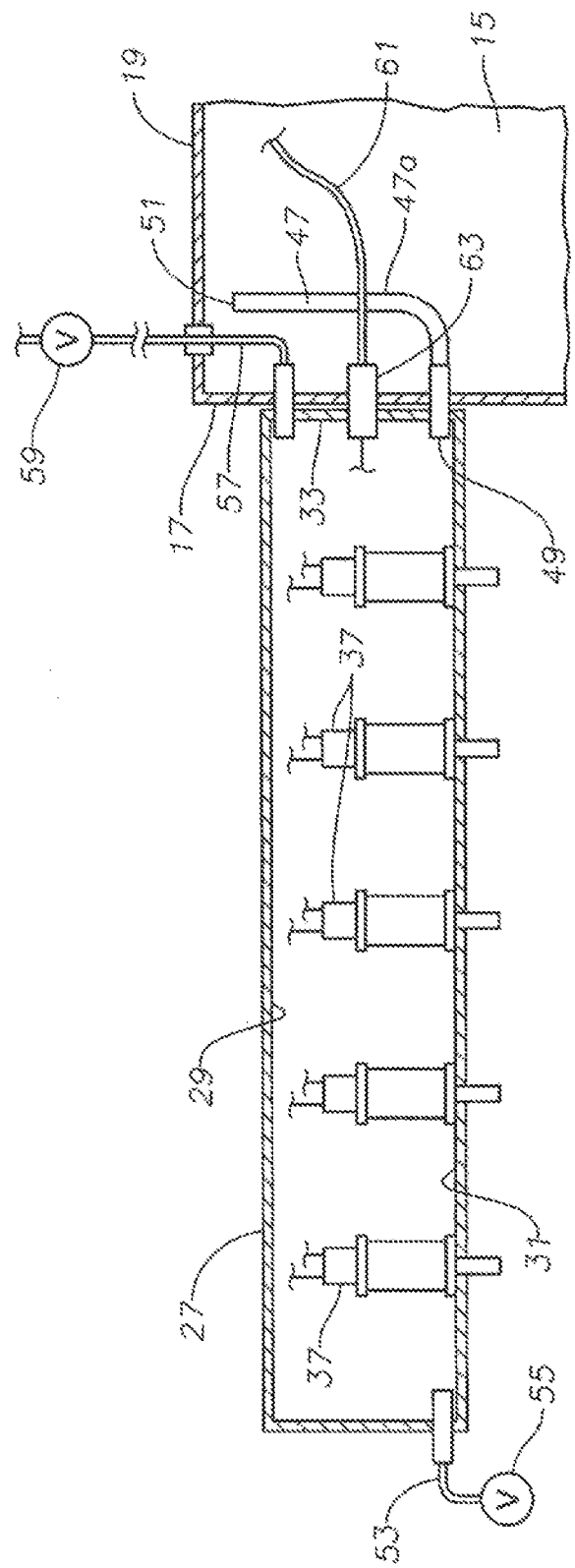
FIG. 2 is a schematic front view of one of the solenoid valve housings and part of the central chamber of FIG. 1 with the front covers removed.

FIG. 2 schematically illustrates one of the solenoid valve housings 27, with the others being the same. Cover plate 35 (FIG. 1) has been removed as well as the front wall of central chamber 15. A separate communication tube 47 extends between each solenoid valve housing 27 and central chamber 15. Each communication tube 47 has a lower portion that extends sealingly through one of the central chamber side walls 17 and sealingly through one of the solenoid housing end walls 33. The lower portion of each communication tube 47 terminates in one of the solenoid valve housings 27 with an open lower end 49 that is near solenoid housing lower side 31 and near one of the end walls 33.

Each communication tube 47 has an open upper end 51 that is located above its lower end 49 and at an elevation above the solenoid valve housing 27 containing its open lower end 49. Preferably, open upper end 51 of each communication tube 47 is at an elevation above the upper side 29 of the uppermost solenoid valve housing 27 in the vertical columns 25a, 25b. The open upper ends 51 may be a short distance below central chamber upper end 19. As illustrated in FIG. 1, the open upper end 51 may be at the same elevation as the open upper ends 51 of the other communication tubes 47.

Each communication tube 47 has a vertical portion 47a extending between its open lower end 49 and open upper end 51. Vertical portions 47a are parallel with each other. The vertical portion 47a of communication tubes 47 extending from lower ones of the solenoid valve housings 27 are longer than vertical portions 47a of communication tubes 47 extending from upper ones of the solenoid valve housings 27. During operation, open upper ends 51 will be below the upper level of dielectric liquid 21 in central chamber 15, which will be at central chamber upper end 19. Dielectric liquid 21 in central chamber 15 communicates with dielectric liquid filling each solenoid valve housing 27 via each communication tube 47.

Referring again to FIG. 2, each solenoid valve housing 27 has a separate drain line 53 to drain dielectric liquid 21 when maintenance to one or more of the solenoid valves 37 therein is needed. In the example, each drain line 53 is located nearer to solenoid valve housing lower side 31 than upper side 29. Drain line 53 is illustrated tube through the outer one of the end walls 33, but it could be located elsewhere. A valve 55, normally manually operated, selectively opens and closes drain line 53.

A separate vent line 57 for each solenoid valve housing 27 assists in draining and filling. Vent line 57 extends from an upper portion of each solenoid valve housing 27 near upper side 29. FIG. 2 illustrates vent line 57 as extending sealingly through the inner end wall 33 and central chamber side wall 17, then out central chamber upper end 19. The vent lines 57 for all of the solenoid valve housings 27 could similarly extend through central chamber upper end 19. Alternately, each vent line 57 could extend directly from each solenoid valve housing 27 and not pass through the inferior of central chamber 15. A vent line valve 59, which may be manually operable, selectively opens and closes each vent line 57. The cavities of pressure compensators 23 may have a similar vent line (not shown) at upper end 19.

Referring still to FIG. 2, a signal line 61, which may be electrical, extends sealingly into each solenoid valve housing 27. Signal line 61 may include separate electrical wires connected to each solenoid valve 37 within a particular solenoid valve housing 27. In this example, a penetrator connector 63 for signal line 61 extends sealingly through apertures in central chamber side wall 17 and in one of the end walls 33 of each solenoid valve housing 27. Signal line 61 extends to the base of subsea electronics modules 43 for communication with circuitry in one of the subsea electronics modules 43. For clarity, FIG. 1 does not show drain lines 53, vent lines 57 and signal lines 61.

During an initial installation of control system 11, technicians fill dielectric liquid 21 into central chamber 15 and solenoid valve housings 27 prior to lowering the BOP subsea. The filling may be performed in different manners. For example, the technician may pump dielectric liquid 21 through a lower inlet (not shown) in central chamber 15 while drain line valves 55 are closed and vent line valves 59 are open. Once the dielectric liquid reaches communication tube upper ends 51, it flows down communication tubes 47 into solenoid valve housings 27 to fill them. Once central chamber 15 and all of the solenoid valve housings 27 are full and trapped air is expelled, the technician closes vent line valves 59.

The operator on a drilling and/or production vessel then lowers the BOP along with control system 11 into the sea. The hydrostatic pressure of the sea will cause pressure compensators 23 to equalize the pressure of dielectric liquid 21 within central chamber 15 and solenoid valve housings 27 with she hydrostatic pressure. The increase in pressure in dielectric liquid 21 in central chamber 15 communicates with the dielectric liquid in each solenoid valve housing 27 via the communication tubes 47, which always remain open. In this example, pressure compensators 23 equalize pressure for solenoid valve housings 27 as well as central chamber 15. Alternately, solenoid valve housings 27 could have their own pressure compensators.

During operation, hydraulic valves 41 will be connected with a hydraulic fluid source, typically via subsea accumulators and a conduit extending to the drilling rig. When a function is desired, the operator at the rig supplies an electrical signal via an umbilical line to one or both subsea electronics modules 43. In turn, circuitry in subsea electronics module 43 sends a signal, normally electrical, through signal line 61 to one of the solenoid valves 37. In response, the solenoid valve 37 provides a hydraulic pilot signal to the hydraulic valve 41 that is linked. In response, the hydraulic valve 41 receiving the pilot signal supplies hydraulic fluid to the selected component of the BOP or receives hydraulic fluid from the selected component.

Any maintenance or replacement of any of the solenoid valves 37 will be performed while the BOP and control system 11 are retrieval. Normally, the operator will have determined which one of the solenoid valves 37 requires repair or replacement. A technician will drain the dielectric liquid 21 contained in only the solenoid valve housing 27 or housings 27 requiring maintenance. The operator opens the particular drain line valve 55 and vent line valve 59, allowing dielectric liquid 21 in the particular solenoid valve housing 27 to drain. Because the drain line valves 55 of the other solenoid valve housings 27 are still closed, they will not drain. Similarly, the drain line (not shown) of central chamber 15 remains closed. A small amount of dielectric liquid 21 in central chamber 15 may flow down the open upper end 51 of the communication tube 47 of the particular solenoid valve housing 27 being drained. However, once the level of dielectric liquid 21 within central chamber 15 drops below open upper ends 51, the flow of dielectric liquid down the communication tube 47 will cease. In this manner, draining even a lowermost one of the solenoid valve housings 27 can occur while keeping the remaining solenoid valve housings 27, including those at higher elevations, full of dielectric liquid 21.

After the draining has been completed, the operator may open cover plate 35 and replace or repair the desired solenoid valves 37. The operator may refill the particular solenoid valve housing 27 by closing the drain line valve 55 and pumping dielectric liquid 21 into a lower portion of central chamber 15. The dielectric liquid 21 rises above the open upper ends 51, then flows downward through the particular communication tube 47 into the particular solenoid valve housing 27 requiring filling. Once full and trapped air has been expelled, the technician closes the particular vent line 59. The operator may then re-deploy the control system 11.

Because only the affected solenoid valve housing or housings 27 need to be drained, a large amount of dielectric fluid 21 in control system 13 will be saved. For example, control system 11 may contain a total of 80 gallons or more of dielectric fluid 21, while a single solenoid valve housing 27 contains only 5 gallons. Also, using only the pressure compensator or compensators 23 within central chamber 15 to equalize pressure in all of the solenoid valve housings 27 in one of the columns 25 reduces the cost required if each solenoid valve housing 27 had its own separate pressure compensator.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

The invention claimed is:
1. A blowout preventer control system, comprising:
a plurality of solenoid valve housings;
a plurality of solenoid valves mounted within each of the solenoid valve housings;
a plurality of hydraulic valves, each of the hydraulic valves being hydraulically connected to and controlled by one of the solenoid valves;
a central chamber containing a dielectric liquid;
a plurality of communication tubes, each of the communication tubes communicating the dielectric liquid in the central chamber with an interior of one of the solenoid valve housings, each of the communication tubes having an open lower end in one of the solenoid valve housings and an open upper end within the central chamber; and a separate drain line mounted to each of the solenoid valve housings to enable draining of one of the solenoid valve housings for maintenance without requiring draining of other of the solenoid valve housings.

2. The system according to claim 1, further comprising:
a pressure compensator within the central chamber for equalizing a pressure of the dielectric liquid within the central chamber and in each of the solenoid valve housings with a hydrostatic pressure of sea water surrounding the system.

3. The system according to claim 1, further comprising
a separate air vent line extending from each of the solenoid valve housings; and
an air vent valve connected to each of the air vent lines.

4. The system according to claim 1, wherein the open upper ends of each of the communication tubes are at substantially the same elevation within the central chamber.

5. The system according to claim 1, wherein the central chamber extends vertically alongside the solenoid valve housings.

6. The system according to claim 1, further comprising a plurality of signal wires, each of the signal wires extending from within the central chamber sealingly through a wall of the central chamber and sealingly through a wall of one of the solenoid valve housings to one of the solenoid valves within said one of the solenoid valve housings.

7. The system according to claim 1, wherein:
each of the solenoid valve housings has a horizontal lower side and a horizontal upper side; and
the open lower end of each of the communication tubes is nearer the lower side than the upper side.

8. The system according to claim 1, wherein each of the communication tubes has a vertical portion within the central chamber, the vertical portions being parallel with each other.

9. The system according to claim 1, further comprising:
a removable cover plate mounted to each of the solenoid valve housings for providing maintenance access to the solenoid valves within each of the solenoid valve housings.

10. A blowout preventer control system, comprising:
a frame;
a plurality of horizontal rows of hydraulic valves mounted to the frame for controlling various functions of the blowout preventer, the rows of hydraulic valves being one above the other in at least one vertical column;
a plurality of solenoid valve housings mounted to the frame, each of the solenoid valve housings being horizontally oriented within the vertical column and adjacent one of the rows of hydraulic valves;
a plurality of solenoid valves mounted within each of the solenoid valve housings, each of the solenoid valves being electrically controlled to selectively provide a hydraulic pilot signal to one of the hydraulic valves in the adjacent one of the rows of hydraulic valves;
a vertically extending central chamber containing a dielectric liquid and extending alongside the solenoid valve housings;
a pressure compensator in the central chamber for reducing a pressure difference between a hydrostatic pressure of sea water surrounding the central chamber and the dielectric liquid in the central chamber housing;
a plurality of communication tubes, each having an open upper end within the central chamber adjacent an upper end of the central chamber, each of the communication tubes having an open lower end extending into one of the solenoid valve housings for communicating dielectric liquid in the central chamber with an interior of each of the solenoid valve housings; and a separate drain line mounted to each of the solenoid valve housings to enable draining of one of the solenoid valve housings for maintenance while the control system is retrieved without requiring draining of other of the solenoid valve housings.

11. The system according to claim 10, wherein:
the open upper ends of the communication tubes are located within the central chamber at substantially the same elevation.

12. The system according to claim 10, wherein the open upper ends of the communication tubes are located at least at an elevation equal to an upper side of an uppermost one of the solenoid valve housings.

13. The system according to claim 10, wherein each of the communication tubes has a vertical portion within the central chamber, the vertical portions being parallel with each other.

14. The system according to claim 10, further comprising:
a removable cover plate mounted to each of the solenoid valve housings for providing maintenance access to the solenoid valves within each of the solenoid valve housings.

15. The system according to claim 10, wherein:
each of the solenoid valve housings has a side wall adjacent and parallel with a side wall of the central chamber.

16. The system according to claim 10, wherein dielectric liquid within each of the solenoid valve housings is pressure compensated solely with the pressure compensator in the central chamber.

17. A method of controlling functions of a blowout preventer, comprising:
providing a blowout preventer control system, comprising:
a plurality of hydraulic valves;
a plurality of solenoid valve housings one above another in at least one vertical column, each of the solenoid valve housings having a separate drain line;
solenoid valves within each of the solenoid valve housings, each being hydraulically connected with one of the hydraulic valves;
a central chamber extending vertically alongside the solenoid valve housings;
a plurality of communication tubes, each of the communication tubes having an open upper end within the central chamber and an open lower end within one of the solenoid valve housings, the open upper ends of the communication tubes being at an elevation at least equal to an upper side of an uppermost one of the solenoid valve housings, the method comprising:
filling the central chamber and the solenoid valve housings with a dielectric liquid, and through the communication tubes, communicating dielectric liquid in the central chamber with an interior of each of the solenoid valve housings;
sending a signal to one of the solenoid valves, and in response sending a hydraulic pilot signal from said one of the solenoid valves to one of the hydraulic valves to control a function of the blowout preventer;
for maintenance to one of the solenoid valves within one of the solenoid valve housings, draining the dielectric liquid from said one of the solenoid valve housings through the drain line of said one of the valve housings without draining dielectric fluid from the other solenoid valve housings; and performing maintenance to said one of the solenoid valves.

18. The method according to claim 17, further comprising:

lowering the system into the sea; and reducing a pressure differential between a hydrostatic pressure of the sea and the dielectric liquid within the central chamber and the solenoid valve housings with a pressure compensator mounted in the central chamber.

19. The method according to claim 17, wherein:

said one of the solenoid valve housings being drained is located at a lower elevation than at least one of the other solenoid valve housings that is not being drained.

\* \* \* \* \*